United States Patent
Ganser et al.

(10) Patent No.: US 6,536,411 B2
(45) Date of Patent: Mar. 25, 2003

(54) METHOD OF OPERATING AN INTERNAL COMBUSTION ENGINE

(75) Inventors: Thomas Ganser, Wernau (DE); Thomas Kaiser, Denkendorf (DE); Charles R. Koch, Ramseck/Pattonville (DE); Michael Kühn, Eberbach (DE); Kurt Maute, Sindelfingen (DE); Martin Spanninger, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/867,168

(22) Filed: May 29, 2001

(65) Prior Publication Data

US 2002/0179055 A1 Dec. 5, 2002

(30) Foreign Application Priority Data

May 23, 2000 (DE) .......................... 100 25 495

(51) Int. Cl.$^7$ ................................. F02P 5/00
(52) U.S. Cl. .............................. 123/406.44; 123/406.47
(58) Field of Search .............................. 123/90.11, 352, 123/361, 399, 406.29, 406.44, 406.45, 406.49, 406.55, 406.52, 681

(56) References Cited

U.S. PATENT DOCUMENTS

| | | | | |
|---|---|---|---|---|
| 5,392,215 A | * | 2/1995 | Morita | 123/352 |
| 5,463,993 A | * | 11/1995 | Livshits et al. | 123/339.11 |
| 6,189,523 B1 | * | 2/2001 | Weisbrod et al. | 123/27 GE |
| 6,311,670 B1 | * | 11/2001 | Constancis | 123/352 |
| 6,332,450 B1 | * | 12/2001 | Muto et al. | 123/352 |
| 6,412,470 B1 | * | 7/2002 | Denz | 123/352 |

FOREIGN PATENT DOCUMENTS

DE 195 30 274 2/1997

* cited by examiner

Primary Examiner—John Kwon
(74) Attorney, Agent, or Firm—Klaus J. Bach (57) ABSTRACT

In a method for operating an internal combustion engine, as a function of a desired load, wherein a desired pressure in the intake pipe of the internal combustion engine is determined and set by means of an air supply device, the ignition timing, the beginning of fuel injection and the duration of fuel injection values are determined in accordance with a predetermined relationship as a function of the desired load and the values are supplied as actuating signals to actuating elements by which the ignition and the fuel injection are adjusted to improve the engine response behavior.

16 Claims, 6 Drawing Sheets

METHOD OF OPERATING AN INTERNAL COMBUSTION ENGINE

BACKGROUND OF THE INVENTION

The invention relates to a method of operating an internal combustion engine wherein a desired intake air pressure is determined as a function of a desired load and set by means of an air supply device controlling the air flow to the cylinders of the engine.

The document DE 195 30 274 A1 discloses a method of controlling an internal combustion engine with fully variable valve drive, which permits the opening and closing of the gas exchange valves independently of one another. The desired load, which results from the position of the acceleration pedal and the momentary slope inclination or which originates from an electronic driving-dynamics control arrangement, is converted by means of a fuel control unit into an amount of fuel to be injected. Injection timing and ignition timing are to be determined using performance graphs. The corresponding amount of fresh air is supplied to the combustion chambers of the internal combustion engine by means of the activation of the gas exchange valves.

In order to regulate the required amount of fresh air, the amount of air actually introduced is determined with the aid of an air mass meter disposed in the intake tract of the internal combustion engine. It is however disadvantageous in this case that the air mass meter reacts comparatively sluggishly, that is, it reacts slowly compared to the movement to be performed by the gas exchange valves. Load changes, which affect the valve stroke of the gas exchange, are implemented by the gas exchange valves without a time delay. The air mass meter, reacting comparatively sluggishly, lags behind the fast reaction of the gas exchange valves, so that measured values of the air mass meter do not correspond to the actual conditions in the intake tract during dynamic changes. As a consequence, for example, during high accelerations or decelerations, a fuel/air ratio deviating from the stoichiometric ratio may be established.

It is the object of the invention to provide for an improved response behavior of internal combustion engines during load changes.

SUMMARY OF THE INVENTION

In a method for operating an internal combustion engine as a function of a desired load, wherein a desired pressure in the intake pipe of the internal combustion engine is determined and is set by means of an air supply device, the ignition timing, the beginning of fuel injection and the duration of fuel injection values are determined in accordance with a predetermined relationship as a function of the desired load and the values are supplied as actuating signals to actuating elements by which the ignition and the fuel injection are adjusted to improve the engine response behavior.

With the novel method, both of the parameters which determine ignition and the parameters which determine injection, such as ignition timing, beginning of fuel injection and duration of fuel injection are determined as a function of the predetermined load, which depends, in particular, on the accelerator pedal position and also, if appropriate on manipulated variables of a driving-dynamics performance graph. These parameters which determine the ignition and the injection timing, are usually already determined for determining the amount of air to be supplied to the internal combustion engine and are thus available in the engine control unit. The ignition timing the beginning of fuel injection and the duration of fuel injection are supplied as actuating signals to actuating elements by which the ignition and the injection are performed.

With the method according to the invention, it is possible for the first time for both, the air side and the fuel side of an internal combustion engine, to be set by means of a common parameter—the desired load. This results in a simpler design of the engine controller and regulator and also of the units used in the internal combustion engine, since a common parameter is used to control both the air supply and the fuel supply, and respectively, the ignition. A further advantage resides in the fast dynamics of an internal combustion engine operated in the manner according to the invention. Since there is no longer a need for an air mass meter or a similar measuring element in the intake tract, measurement-dictated delays are eliminated. Accordingly, the internal combustion engine can react more rapidly to load changes, and mixture formation errors are reduced. Corrections in the event of deviation from the stoichiometric fuel/air ratio can, if appropriate, be compensated for by means of the lambda control. Furthermore, it is also possible to control engine knocking so as to prevent damaging engine knocking by adjusting the ignition timing.

The novel method is preferably used in internal combustion engines which have an adjustable air supply device for supplying combustion air to the cylinders, in particular adjustable gas exchange valves or, alternatively, both adjustable gas exchange valves and a throttle valve. The engines are furthermore equipped with an engine control unit, in which, as a function of input signals characterizing the operating state of the internal combustion engine, actuating signals are generated in accordance with stored performance graphs. The signals are fed to actuating elements of the internal combustion engine, in particular for the ignition and the fuel injection and also the air supply devices. Electromagnetic, variably adjustable gas exchange vales are preferably used. However, mechanically adjustable gas exchange valves may also be appropriate.

In an advantageous embodiment of the invention, the ignition timing, the beginning of injection and the duration of injection are determined as a function of external pressure and external temperature in order to adapt the air volumes supplied to the combustion chambers to the given ambient conditions.

During steady-state operation of the internal combustion engine, preferably an average injection duration is determined, which, using a proportional factor, is converted into an average load value, which is compared with the momentarily set load. The difference between the set load and the average load value is taken into account for ignition and injection and, in particular, also for the air supply. As a result, abrupt changes in the set load do not abruptly affect ignition, injection timing and air supply, but rather are passed on in smoothed fashion, as a result of which, overall, a more harmonious response behavior of the internal combustion engine is achieved.

Further advantages of the invention will become apparent from the following description on the basis of the accompanying drawings.

DESCRIPTION OF A PREFERRED EMBODIMENT

Figure 1:
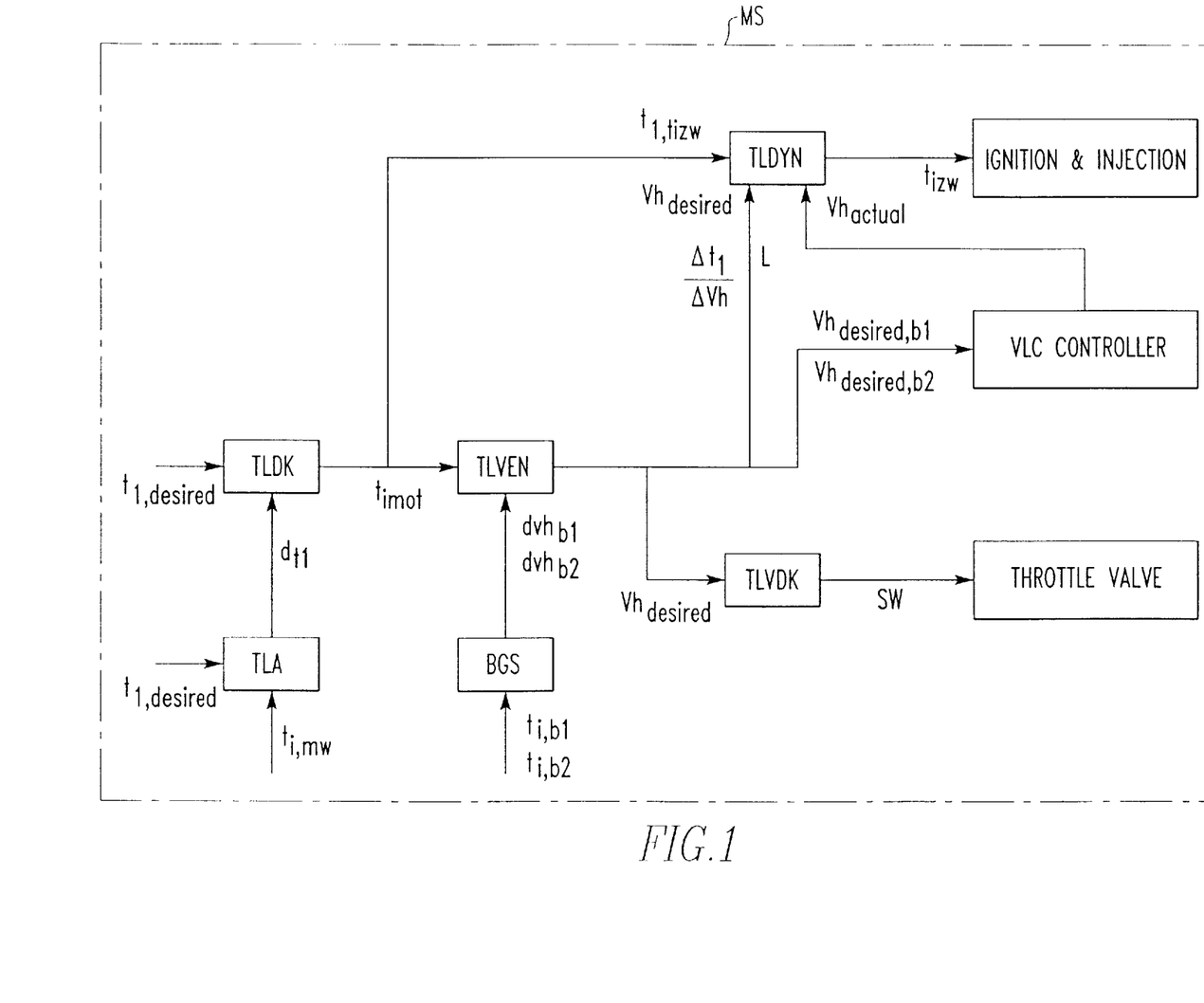
FIG. 1 shows the arrangement of an engine control unit for setting the ignition and the injection as a function of the desired load.

FIG. 1 shows diagrammatically the arrangement of an engine control unit for the metering of combustion air and the determination of the associated ignition data and injection data, where the amount of combustion air is to be set both by means of a throttle element, in particular a throttle valve, in the intake tract and by means of variably adjustable gas exchange valves provided with VLC (variable lift control) controllers. In the engine control unit MS, firstly the desired load $t_{1\ desired}$ is determined, which can be represented as a function of the accelerator pedal position and, if appropriate, of further variables, in particular the present slope inclination. The desired load $t_{1\ desired}$ may additionally depend on control variables of a driving-dynamics control program.

The desired load $t_{1\ desired}$ is firstly supplied to a function block TLA comprising an adaptation function for averaging the parameters relating to ignition and injection during steady-state operation. In the function block TLA, a correction load $dt_1$ is determined as a function of the desired load $t_{1\ desired}$ and of an average injection duration $t_i$, mw, which correction load is fed as correction element to a further function block TLDK.

An ambient compensation takes place in the function block TLDK in that first the desired load $t_{1\ desired}$, taking into consideration the ambient pressure $p_a$ and also the ambient temperature $T_a$, is based on normalized pressure and temperature values $p_{a,0}$, $T_{a,0}$. Moreover, the correction load $dt_1$ is additively taken into account in the function block TLDK. A value for the desired air volume $t_{1,mot}$ is present at the output of the function block TDLK, which value corresponds to the predetermined load $t_{1\ desired}$ taking account of the ambient conditions and the correction load. The desired air volume $t_{1,mot}$ is assigned ignition and injection parameters $t_{1,\ tizw}$ (desired load for ignition and injection).

The desired air volume $t_{1,\ mot}$ is first fed to a function block TLVEN, in which the valve stroke for the variably adjustable gas exchange valves of the internal combustion engine is determined as a function of the air volume $t_{1,mot}$. In the exemplary embodiment, the internal combustion engine shall have two separately activatable cylinder banks, each cylinder bank being assigned gas exchange valves having an adjustable stroke. Following this structure, different values $vh_{desired,b1}$ and $vh_{desired,b2}$ for the desired valve stroke of the gas exchange valves of the first and second cylinder banks of the internal combustion engine are generated in the function block TLVEN. In this case, correction valve strokes $dvh_{b1}$, $dvh_{b2}$ from a bank equalizing function block BGS are taken into account, differing values for the valve strokes of different cylinder banks being matched to an average value in the bank equalizing function block.

The desired value stroke $vh_{desired,b1}$ and $vh_{desired,b2}$ is fed as desired value to be set to a VLC controller, which can be used to manipulate the valve stroke of the gas exchange valves.

If appropriate, more than two cylinder banks with separately adjustable gas exchange valves may also be provided.

Depending on the operating range, in which the internal combustion engine is operated, it may be necessary, in addition, or as an alternative, to the setting of the gas exchange valves, also to actuate a throttle element, in particular a throttle valve, in the intake pipe of the internal combustion engine in order to be able to set the amount of combustion air corresponding to the present operating state of the internal combustion engine. The actuation of the throttle valve is necessary in particular in operating ranges in which the desired intake pressure lies below atmospheric pressure. In this case, it is necessary to generate a negative pressure in the intake pipe, which can be done by corresponding positioning of the throttle valve.

The throttle valve is assigned a function block TLVDK, which is used to activate the throttle valve as a function of the valve stroke $vh_{desired}$. The valve stroke $vh_{desired}$ represents an average value of the valve-stroke values $vh_{desired,b1}$ and $vh_{desired,b2}$ of the left and right cylinder banks of the internal combustion engine. From the averaged valve stroke $vh_{desired}$, a value for the throttle-valve actuating angle sw is determined in the function block TLVDK, which value is fed to a throttle-valve-actuating element for setting the throttle valve.

In addition to the setting of the gas exchange valves and, if appropriate, of the throttle valve, the ignition timing, the beginning of fuel injection and the duration of fuel injection are determined as a function of the predetermined load $t_{1,tizw}$ in a further function of the block TLDYN. The desired air mass $t_{1\ desired}$ is assigned ignition and injection parameters $t_{1,tizw}$, which are processed further in the function block TLDYN. The desired and actual lift values $vh_{desired}$ and $vh_{actual}$ of the valve stroke are additionally fed to the function block TLDYN, the quantities being present at the output of the function block TLVEN assigned to the valves and, respectively, in the VLC controller of the gas exchange valves.

Effects occurring during non-steady-state operation are compensated for in the function block TLDYN. These effects may arise by virtue of the fact that both the throttle valve and the controllers for the gas exchange valves have finite actuating times, which can lead to deviations between the desired values and the actual values in dynamic transition regions. These deviations may affect the amount of air disposed in the cylinders, and, accordingly, the ignition and injection parameters must be adapted to the actual amount of air. This adaptation is carried out in the function block TLDYN.

After adaptation to non-steady-state operation in the function block TLDYN, the adapted ignition and injection parameters $t_{izw}$ are fed to the actuating elements for ignition and injection, and the ignition timing, the beginning of injection and the duration of injection are set as a function of the predetermined load taking account of non-steady-state influences.

The function blocks of the engine controller and regulator MS are illustrated in detail in FIGS. 2 to 7.

Figure 2:
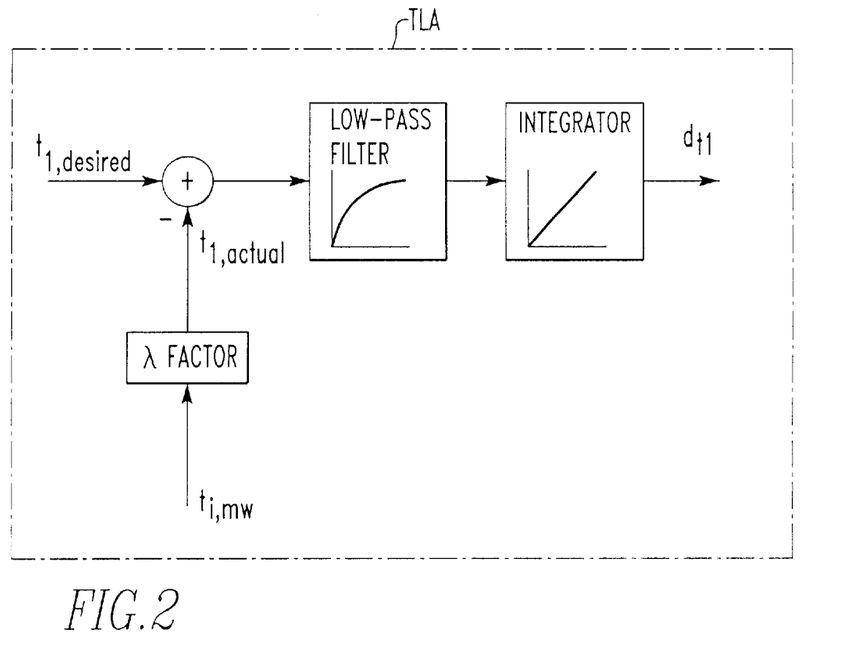
FIG. 2 shows a function block with an adaptation function for averaging the parameters relating to ignition and injection during steady-state operation.

FIG. 2 shows the function block TLA, which carries out averaging of the parameters relating to ignition and injecting during steady-state operation. The desired load $t_{1,desired}$ and also the average injection duration $t_{1,mw}$ are fed as input values to the function block TLA. The average injection duration $t_{i,mw}$ is firstly converted into the actual load $t_{1,actual}$ by exposure to a λ factor, the actual load corresponding to the actual air mass disposed in the cylinder. The difference between desired load $t_{1,desired}$ and actual load $t_{1,actual}$ is formed and this difference is filtered in a low-pass filter, in which frequencies above a low-pass filter cut-off frequency are filtered out, in order to obtain a smoothed profile of values. The low-pass filtering is followed by integration in an integrator element. The correction load $dt_1$ is present at the output of the integrator element and is used to compensate for the difference between predetermined load $t_{1,desired}$ and actual load $t_{1,actual}$. The correction load $dt_1$ is fed to the function element TLDK, in which ambient pressure and ambient temperature are taken into account.

Figure 3:
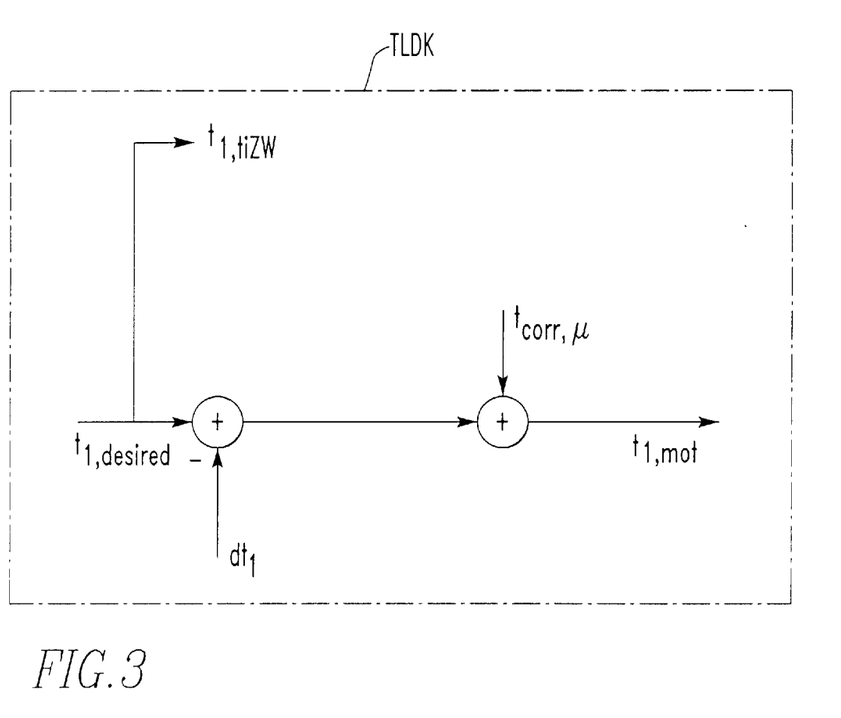
FIG. 3 shows a function block with a function for taking account of ambient pressure and ambient temperature.

The function block TLDK for taking account of ambient pressure and ambient temperature is illustrated in detail in FIG. 3. The correction load $dt_1$ from the function block TLA is added to the desired load value $t_{1,desired}$. The sum of desired load $t_{1\ desired}$ and correction load $dt_1$ is multiplied by an ambient correction factor $f_{corr,U}$, which can be represented as a function of the momentary external temperature $T_a$, the momentary external pressure $p_a$ and also as a function of normalized values for pressure and temperature $p_{a,0}$ and $T_{a,0}$ in accordance with the relationship:

$$f_{corr,U} = p_{a,0}/p_a * T_a/T_{a,0}$$

By means of multiplication by the correction factor $f_{corr,U}$, the desired load is based on the normalized pressure and temperature values $p_{a,0}$ and $T_{a,0}$. What is obtained as a result of the multiplication is the desired air flow volume $t_{1,mot}$, which is present at the output of the function block TLDK and is fed to the further function blocks.

Ignition and injection parameters $t_{1,tizw}$ are additionally determined from the desired air mass flow $t_{1\ desired}$.

Figure 4:
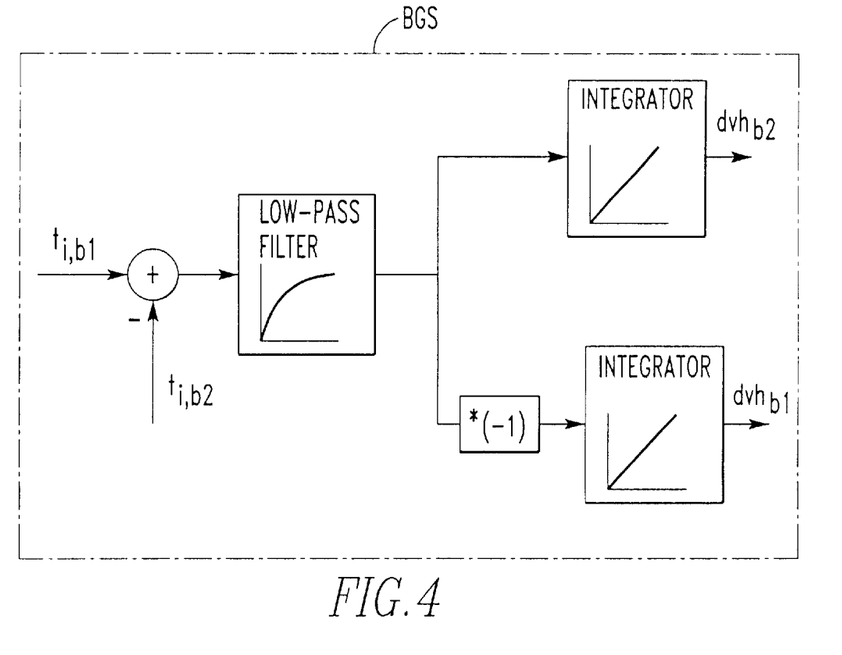
FIG. 4 shows a function block with a function for determining correction values in the event of differing condition values in different cylinder banks of an internal combustion engine.

FIG. 4 illustrates the function block for bank equalization or bank balancing BGS, in which the condition variables of different cylinder banks of an internal combustion engine are matched to provide common values. In the bank equalizing arrangement BGS shown in the exemplary embodiment, the condition variables of two cylinder banks of an internal combustion engine are matched to one another; however, embodiments are also conceivable, in which more than two cylinder banks of an internal combustion engine are to be taken into account.

Bank-selective injection times $t_{i,b1}$ and $t_{i,b2}$ respectively, assigned to a cylinder bank are supplied as input quantities to the bank equalizing arrangement BGS. The difference between the bank-selective injection times $t_{i,b1}$ and $t_{i,b2}$ is formed and fed to a low-pass filter in order to filter out frequencies below the low-pass filter cut-off frequency and to obtain a smoothed profile of values. The low-pass filtering is followed by integration in integrator elements, a positive value $dvh_{b2}$ for the correction valve stroke being fed to that cylinder bank whose bank-selective injection time $t_{i,b2}$ was subtracted at the input of the function block, whereas a negative value $dvh_{b1}$ for the correction valve stroke is fed to that cylinder bank whose bank-selective injection time $t_{i,b1}$ is positive at the input of the function block. This sign reversal results in matching to a common average value in that the values—deviating from an average value—for the bank-selective injection times $t_{i,b1}$ and $t_{i,b2}$, respectively, are compensated for by an opposite correction element.

Figure 5:
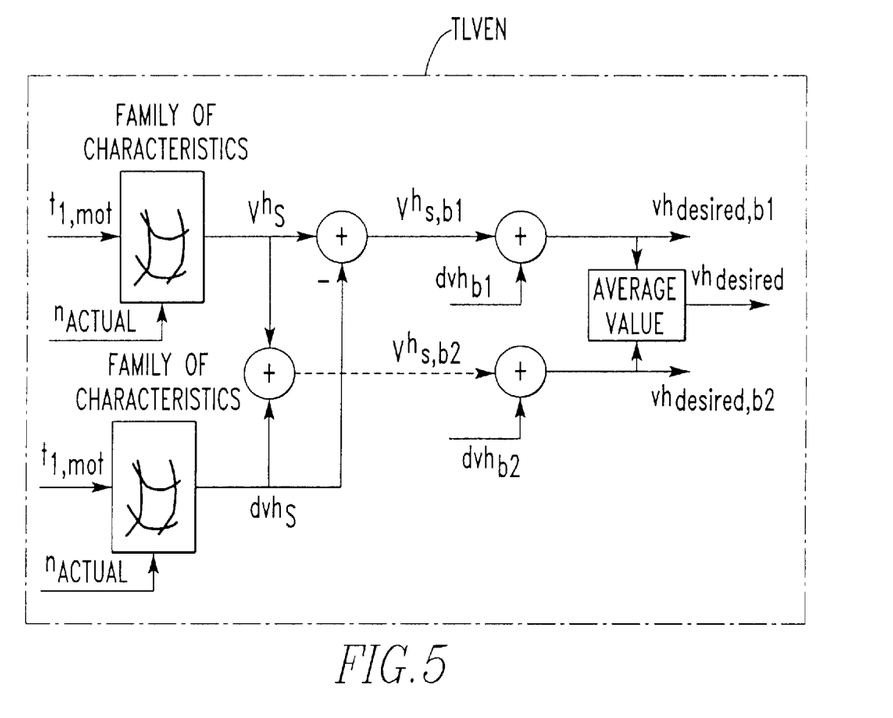
FIG. 5 shows a function block with a function for determining the desired valve stroke corresponding to the set load.

FIG. 5 shows a detailed illustration of the function block TLVEN for determining the desired valve stroke $vh_{desired,b1}$ and $vh_{desired,b2}$ for each cylinder bank of the internal combustion engine. The desired air volume $t_{1,mot}$ and the engine speed $n_{actual}$ are fed as input quantities to the function block TVLEN. In performance graphs of the function block TLVEN, an average valve-stroke actuating value $vh_s$ and an average valve-stroke correction value $dvh_s$ are determined from the desired air volume $t_{1,mot}$ as a function of speed. The correction value $dvh_s$ is first subtracted from the actuating value $vh_s$, thereby obtaining a provisional desired valve stroke $vh_{s,b1}$ for the first cylinder bank, and secondly the correction value $dvh_s$ is added to the actuating value $vh_s$, thereby obtaining a second, provisional desired valve stroke $vh_{s,b2}$ for the second cylinder bank. The correction valve stroke $dvh_{b1}$ and $dvh_{b2}$ assigned to the respective cylinder bank is added to the provisional desired valve strokes $vh_{s,b1}$ and $vh_{s,b2}$, respectively; the correction valve strokes $dvh_{b1}$ and $dvh_{b2}$ for the first and the second cylinder bank, respectively, were determined in the bank equalizing block BGS (FIG. 4) connected upstream of the function block TVLEN for valve stroke determination.

The final desired valve strokes $vh_{desired,b1}$ and $vh_{desired,b2}$ for the gas exchange valves of the first and the second cylinder bank, respectively, are calculated from the addition of the provisional desired valve strokes $vh_{s,b1}$ and $vh_{s,b2}$ to the assigned correction valve strokes $dvh_{b1}$ and $dvh_{b2}$, respectively. Moreover, an average value $vh_{desired}$ is expediently calculated from the two desired valve strokes $vh_{desired,b1}$ and $vh_{desired,b2}$.

Figure 6:
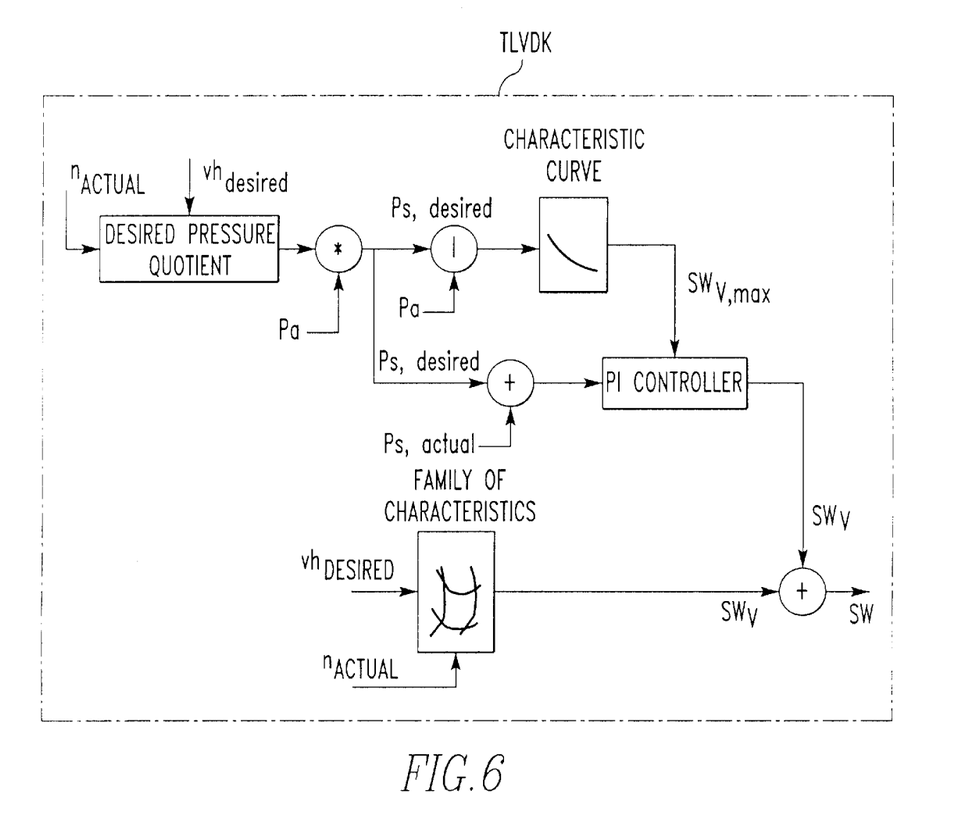
FIG. 6 shows a function block with a function for determining the desired position of the throttle element in the intake tract of the internal combustion engine.

FIG. 6 illustrates the method of operation of the function block TLVDK comprising the arrangement for the throttle valve control. The average value $vh_{desired}$—determined in the function block TLVEN (FIG. 5)—for the valve stroke together with the engine speed $n_{actual}$ are fed as input values to the function block TLVDK. From there, a desired pressure quotient is formed, which is multiplied by the momentary external pressure $p_a$ in order to obtain a desired pressure $p_{s,desired}$. In a first branch of the function block TLVDK, the desired pressure $p_{s,desired}$ is divided by the value of the momentary external pressure $p_a$ and fed to a characteristic curve which provides for maximal controller limit $sw_{r,max}$ for the throttle-valve angle.

Moreover, in a further branch of the function block TLVDK, the desired pressure $p_{s,desired}$ is compared with the actual pressure $p_{s,actual}$ prevailing in the intake pipe, and the difference between desired pressure and actual pressure in the intake pipe is fed as input value to a PI controller. The control regulator output $sw_r$ of the PI controller is limited to the controller limit $sw_{r,mas}$.

Subsequently the controller output $sw_r$ that has been determined is added to a precontrol value $sw_v$ of the throttle-valve angle, the precontrol value $sw_v$ being determined from a performance graph as a function of the desired valve stroke $vh_{desired}$ and the engine speed $n_{actual}$. The resulting throttle-valve angle sw is fed to a throttle-valve actuating element.

Figure 7:
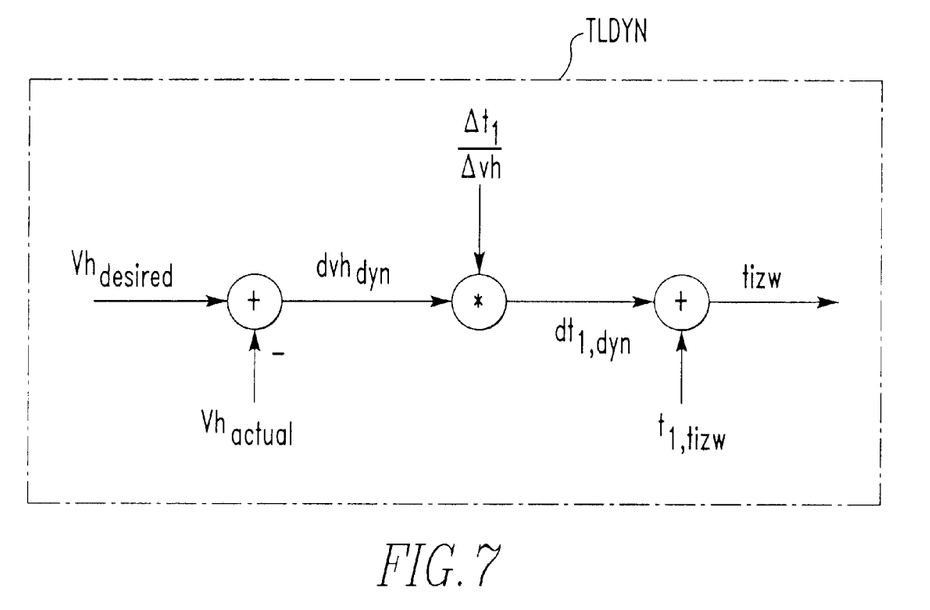
FIG. 7 shows a function block with a function for taking into consideration dynamic effects during ignition and injection during non-steady-state operation of the internal combustion engine.

FIG. 7 illustrates a function block TLDYN for taking account of dynamic effects during ignition and injection during non-steady-state operation of the internal combustion engine. The values for the actual valve stroke $vh_{actual}$ and the desired valve stroke $vh_{desired}$ are fed as input values to the function block TLDYN, from which values a difference $dvh_{dyn}$ is formed, the actual valve stroke $vh_{actual}$ being preferably tapped off from the VLC controller of the gas exchange valves. The differential valve stroke $dvh_{dyn}$ is multiplied by a gradient calculated from the division of a load change $\Delta t_1$ by a valve-stroke change $\Delta vh$, the load change $\Delta t_1$ being determined from two temporarily successive desired values $t_{1,desired}$ and the valve-stroke change $\Delta vh$ denoting the change in successive desired valve strokes $vh_{desired}$ with respect to time. Multiplying the differential valve stroke $dvh_{dyn}$ by the gradient formed by th quotient of the load change and the valve-stroke change yields a dynamic load change $dt_{1,dyn}$, to which then the ignition and injection parameters $t_{1,tizw}$ for the steady-state-internal combustion engine condition are added. The addition of the steady-state ignition and injection parameters $t_{1,tizw}$ to the value of the dynamic load change $dt_{1,dyn}$ produces dynamic ignition and injection parameters $t_{1izw}$ which are supplied to the devices of the internal combustion engine which are responsible for ignition and injection.

Figure 8:
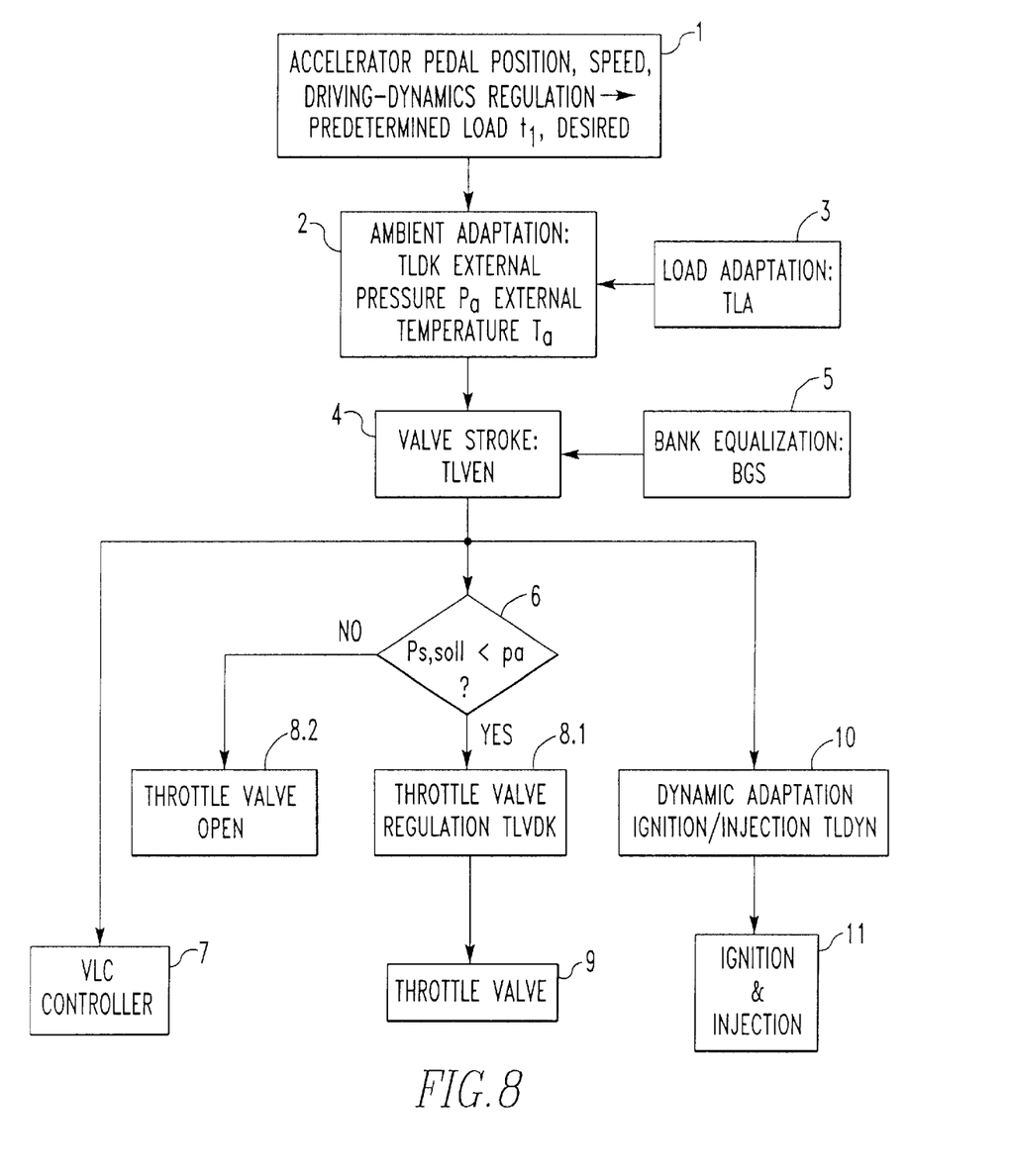
FIG. 8 shows a flow diagram for predictive load control in an internal combustion engine with a variable valve stroke.

FIG. 8 shows a flow diagram containing the individual steps which are to be carried out for predictive load control of an internal combustion engine provided with gas exchange valves with a variable valve stroke. The method steps illustrated in FIG. 8 are carried out in the engine controller and regulator MS from FIG. 1.

In accordance with a first method step 1, the momentarily desired load $t_{1,desired}$ is determined from the accelerator pedal position, from the engine speed and also, if appropriate, from further variables such as, a driving-dynamics control or control variables of an electronic stability program. The desired load $t_{1,desired}$ is processed further in the subsequent method step 2 in a function block TLDK, in which ambient conditions are taken into account. The ambient pressure $p_a$ and the ambient temperature $T_a$ are taken into account, normalization to a standard pressure and a standard temperature being carried out. Moreover, results of upstream load adaptation in method step 3 may be taken into account in method step 2, where the load adaptation is carried out in the function block TLA.

After the ambient conditions have been taken into account, the desired valve stroke which is to be performed by the gas exchange valves in accordance with the predetermined load is determined in a further method step 4. The valve stroke is determined in a function block TLVEN. Upstream of this function block, there may be a method step 5, in which bank equalization is taken into account, in which differing condition variables of different cylinder banks of the internal combustion engine are equalized. The determination of the correction values for carrying out the bank equalization takes place in the function block BGS.

After the determination of the desired valve stroke in method step 4 in the function block TLVEN, in the next method step 6, an interrogation is made as to whether the required desired pressure $p_{s,desired}$ is less than the ambient pressure $p_a$. In the no branch, the throttle valve is brought to the open position (method step 8.2), and in the yes branch, the throttle valve is activated by means of the pressure regulation (method steps 8.1 and 9). The VLC controller is activated in each case (method step 7).

If the interrogation in method step 6 reveals that the desired pressure $p_{s,desired}$ lies below the ambient pressure $p_a$, the yes branch is continued in accordance with method steps 8.1 and 9 according to which the throttle-valve position is adjusted in order to generate an intake-pipe negative pressure. In method step 8.1, which represents the function block TLVDK, the control of the throttle-valve position as described in FIG. 6 is carried out, and in method step 9, the control value is supplied to an actuating element of the throttle valve for adjusting the throttle valve position.

It may be expedient to adjust the throttle valve and additionally control the gas exchange valves. In this case, an alternative setting of the throttle valve position is not performed. Rather in each case the throttle valve and also the gas exchange valves are adjusted, the magnitude of the throttle valve adjustment being determined by performance graph values. If the desired pressure is in the vicinity of the ambient pressure or exceeds the ambient pressure, the throttle valve position is not altered, or it is only minimally altered, in accordance with the value provided by the performance graph.

After the determination of the desired valve stroke in method step 4, the ignition and injection are carried out in parallel with the setting of the gas exchange valves (method step 7) and/or the throttle valve (method steps 8.1 or 8.2 and 9) in accordance with method steps 10 and 11, the desired load being used as a basis for the setting of the values for ignition and injection timing. In method step 10, first an adaptation to dynamic processes in the internal combustion engine is carried out, in order to ensure that effects occurring in non-steady-state operation, in particular inertias of mechanical actuators, are compensated for. In the subsequent method step 11, the values based on the desired load, if appropriate with adaptation to the dynamic processes in the internal combustion engine, for the ignition and injection are supplied to the respective control devices of the internal combustion engine for setting the ignition timing, the beginning of fuel injection and the duration of fuel injection.

What is claimed is:

1. A method for operating a fuel injected internal combustion engine including a number of cylinders, an air intake leading to said cylinders and an air supply control device disposed in said air intake for supplying combustion air to said cylinders, and actuating elements for adjusting ignition timing, fuel injection timing and fuel injection duration, said method comprising the steps of determining, as a function of a desired load ($t_{1,desired}$), a desired pressure ($p_{s,desired}$) in said air intake of said internal combustion engine, controlling said air supply control device so as to provide said desired pressure for the combustion air supplied to the cylinders of said internal combustion engine, determining an average injection duration ($t_{i,mw}$), forming therefrom an average load value ($t_{1,average}$), comparing said average load value ($t_{i,average}$) with the desired load ($t_{1,desired}$), forming the difference between said desired load $t_{1,desired}$) and the average load value ($t_{1,average}$) and determining therefrom the ignition timing, the beginning of fuel injection and the duration of fuel injection in accordance with a predetermined relationship and supplying said values as actuating signals to said actuating elements.

2. A method according to claim 1, wherein a desired air volume ($t_{1,mot}$), is determined from said desired load ($t_{1,desired}$) and said air supply device is controlled on the basis of said desired air volume ($t_{1,mot}$).

3. A method according to claim 1, wherein the relationship between the ignition timing and, respectively, injection, and the predetermined load is stored in a performance graph.

4. A method according to claim 1, wherein the timing of the ignition and of the fuel injection, respectively, is based on lambda control.

5. A method according to claim 1, wherein the setting of the ignition and of the injection, respectively, is based on engine knock control.

6. A method according to claim 1, wherein ambient pressure ($p_a$) and the ambient temperature ($T_a$) are taken into account in the determination of the ignition timing, the beginning of fuel injection and duration of fuel injection.

7. A method according to claim 6, wherein said actuating signal which provides for the ignition timing, the beginning and respectively, the duration of injection is proportional to the ambient temperature ($T_a$) and inversely proportional to the ambient pressure ($p_a$).

8. A method according to claim 1, wherein the difference between the desired load ($t_{1,desired}$) and the average load value ($t_{1,actual}$) is low-pass-filtered and integrated.

9. A method according to claim 1, wherein, in the event of a load change, dynamic effects of the air supply device are taken into account in that, in the dynamic transition region, the actual position of the air supply device is determined and the settings for ignition timing and fuel injection are carried out in accordance with the actual position of the air supply device.

10. A method according to claim 1, wherein gas exchange valves with variable valve control are used as air supply control device.

11. A method according to claim 10, wherein a desired valve stroke ($M_{v,desired}$) of the gas exchange valve is determined as a function of the engine speed ($n_{actual}$).

12. A method according to claim 11, wherein the desired valve stroke ($H_{v,desired}$) of the gas exchange valves is determined as a function of the desired air flow volume ($t_{1,mot}$) in the intake pipe.

13. A method according to claim 10, wherein a throttle device disposed in the intake pipe is provided as the air supply control device in addition to the variably controllable gas exchange valves, and is used at operating points of the internal combustion engine at which the desired pressure ($p_{desired}$) is below ambient pressure ($p_A$).

14. A method according to claim 13, wherein the throttle device has a throttle element which is controlled as a function of the desired valve stroke ($H_{v,desired}$) of the gas exchange valves.

15. A method according to claim 1, wherein the internal combustion engine has at least two cylinder banks that can be controlled separately and at least one engine related characteristic value (ignition timing, beginning of fuel injection, duration of fuel injection, opening and closing curves of the gas exchange valves) which describes the behavior of the internal combustion engine is determined for each cylinder bank, and, in the event of a difference between the characteristic values of the cylinder banks, at least one cylinder bank is manipulated in such a way that the average value of said characteristic value of all the cylinder banks corresponds to a desired average value.

16. A method according to claim 15, wherein the momentary injection times in each cylinder bank are determined.

* * * * *